United States Patent [19]
Watts et al.

[11] Patent Number: 5,748,719
[45] Date of Patent: May 5, 1998

[54] RELAY CIRCUIT FOR TELEPHONE INTERFACE

[75] Inventors: Robert F. Watts, Houston; Benjamin H. Skinker, Spring; Kai Wang, Houston, all of Tex.

[73] Assignee: Compaq Computer Corporation, Houston, Tex.

[21] Appl. No.: 577,724

[22] Filed: Dec. 22, 1995

[51] Int. Cl.[6] .................................................. H04M 1/56
[52] U.S. Cl. ........................ 379/142; 379/98; 379/127; 379/373; 379/376
[58] Field of Search .......................... 379/98, 142, 127, 379/100, 373, 374, 375, 376

[56] References Cited

U.S. PATENT DOCUMENTS

| | | |
|---|---|---|
| 4,093,830 | 6/1978 | Pappas .................................. 379/164 |
| 5,040,209 | 8/1991 | Greenberg et al. ..................... 379/373 |
| 5,062,133 | 10/1991 | Melrose ................................. 379/94 |
| 5,113,432 | 5/1992 | Van Santbrink et al. ............... 379/100 |
| 5,151,972 | 9/1992 | Lorenz et al. ......................... 379/93 |
| 5,315,650 | 5/1994 | Smith et al. ........................... 379/399 |
| 5,467,385 | 11/1995 | Reuben et al. ........................ 379/88 |
| 5,546,448 | 8/1996 | Caswell et al. ........................ 379/142 |

Primary Examiner—Harry S. Hong
Assistant Examiner—Taunya A. McCarty
Attorney, Agent, or Firm—Jenkens & Gilchrist

[57] ABSTRACT

A reduced number of relays are used in a voice/data/fax modem system. This reduced relay design eliminates at least one relay required in prior art systems thereby reducing the amount of geography used in producing the resultant device. This saves space, reduces costs, and provides a more reliable device.

12 Claims, 3 Drawing Sheets

RELAY CIRCUIT FOR TELEPHONE INTERFACE

BACKGROUND OF THE INVENTION

1. Field of the Invention

The present invention is directed to relay circuitry arrangements for voice/data/fax modems and the like. More particularly, the present invention is directed to an improved "two relay" design that may be used in the analog interface portion found in, for example, a voice/data/fax modem.

2. Description of the Related Art

As additional features are being added to conventional modems that are connected to analog telephone lines, improvements in the functionality of these devices require additional relays for switching in the analog section. The additional relays are used in various combinations to perform different modem operations. Destinations can be such as "modem transmitter/receiver" (e.g., where a telephone is in a "picked-up" state and a number to, for example, a computer on-line service is being dialed); "caller-id receiver" (e.g., where the telephone number of a distant party is sent; generally between the first and second rings); and "local telephone handset" (e.g., during which typical telephone communication takes place). In all such cases, the source could be a conventional "tip and ring".

In a typical prior art system, such as that shown in FIG. 1, a typical three relay design is used. The design incorporates three 1-FORMA relays, shown in FIG. 1 as relays 10, 20, and 30. Each relay 10, 20, 30 has a single contact and is closed when energized (please note that the relays shown in FIG. 1 are depicted in the open, nonenergized state). Further, each relay 10, 20, 30 is energized by a independent control signal; R1, R2, and R3, respectively. This type of design suffers because a large amount of real estate is needed for the three relays, because overall reliability is lower with three (as opposed to fewer) components, and because costs are higher with three (also as opposed to fewer) components. This type of design also suffers because it has an unduly complicated design, a fact that follows from the fact that it includes three relays.

As can be seen from the following Table 1, there are eight possible combinations of the relays 10, 20, and 30 in the various open or closed states. However, of these eight possible combinations, only four states will normally be used in a voice/data/fax modem. State 1 is defined as a single connection from tip and ring to the modem receiver/transmitter. State 2 is defined as a single connection from tip and ring to the local telephone handset. State 3 is defined as the combined connection of tip and ring to the modem receiver/transmitter as well as to the local telephone handset. State 4 is defined as the combined connection of tip and ring to the caller-id receiver as well as to the local telephone handset. In State 1 relay 30 is the only relay closed. In State 2 relay 10 is the only relay closed. In State 3 relays 10 and 30 are closed and relay 20 is open. In State 4 relays 10 and 20 are closed and relay 30 is open. Since there are eight possible states, and only four states are used, it should be appreciated that an undue amount of real estate is tied up in the prior art design to provide unnecessary—that is, unused—states.

TABLE 1

| State | 10 Local Telephone Handset | 20 Caller-id Receiver | 30 Modem Transmitter/ Receiver |
|---|---|---|---|
| unused | open | open | open |
| State 1 | open | open | closed |
| unused | open | closed | open |
| unused | open | closed | closed |
| State 2 | closed | open | open |
| State 3 | closed | open | closed |
| State 4 | closed | closed | open |
| unused | closed | closed | closed |

Based upon the foregoing, it should be understood and appreciated that prior art relay designs incorporated into conventional modems have a multitude of shortcomings and deficiencies.

SUMMARY OF THE INVENTION

The present invention overcomes the shortcomings and deficiencies of the prior art by providing a relay circuit connection apparatus including at least one input connection port for connection to an analog telephone line, a first relay having at least one input connected to the input connection port and having at least two output connection ports and wherein the output connection ports are connected to the input connection port in response to a control signal, and a second relay having at least one input connected to at least one of the output connection ports of the first relay and having at least two output connection ports and wherein the output connection ports are connected to the input connection port of the second relay in response to a control signal.

In certain embodiments of the present invention, there may also be an output connection directly coupling an output connection port of the first relay and an output connection port of the second relay.

In the foregoing or other embodiments of the present invention, there may be an output connection directly coupling an output connection port of the first relay without any connection of any output port of the second relay.

Still further, according to the teachings of the present invention, certain embodiments of the present invention may include an output connection directly coupling an output connection port of the second relay without any connection of any output port of the first relay.

Accordingly, an object of the present invention is to reduce the number of relays necessary to connect or disconnect an incoming analog signal to different destinations in the circuitry of an analog voice/data/fax modem.

Another object of the present invention is to provide a relay circuit connection apparatus having reduced "real estate" requirements.

Yet another object of the present invention is to provide a relay circuit connection apparatus that is simpler, and thus has less potential failure points, than counterpart prior art apparatus.

Still yet another object of the present invention is to provide a relay circuit connection apparatus that has a lower cost of implementation, relative to counterpart prior art apparatus, due to fewer components.

BRIEF DESCRIPTION OF THE DRAWINGS

Further objects, advantages and novel features of the present invention can be understood and appreciated from the following detailed description of the invention, taken in conjunction with the accompanying drawings wherein.

DETAILED DESCRIPTION OF A PREFERRED EMBODIMENT OF THIS INVENTION

A unique feature and advantage of the present invention is reduction in the number of relays necessary to connect or disconnect an incoming analog signal to different destinations in the circuitry of an analog voice/data/fax modem.

Figure 1:
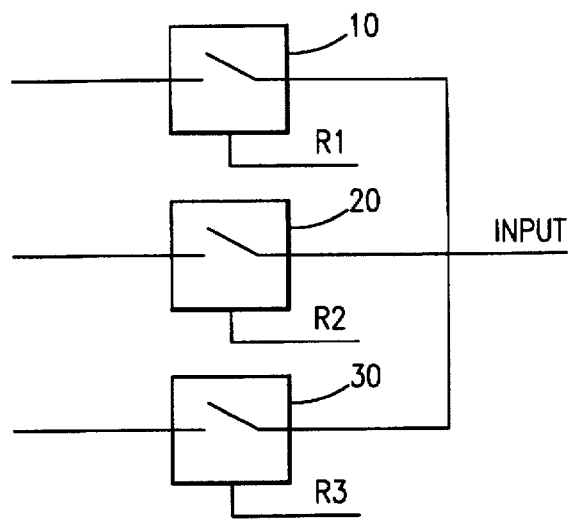
FIG. 1 is a figure showing the typical three relay design (previously discussed)
Figure 2:
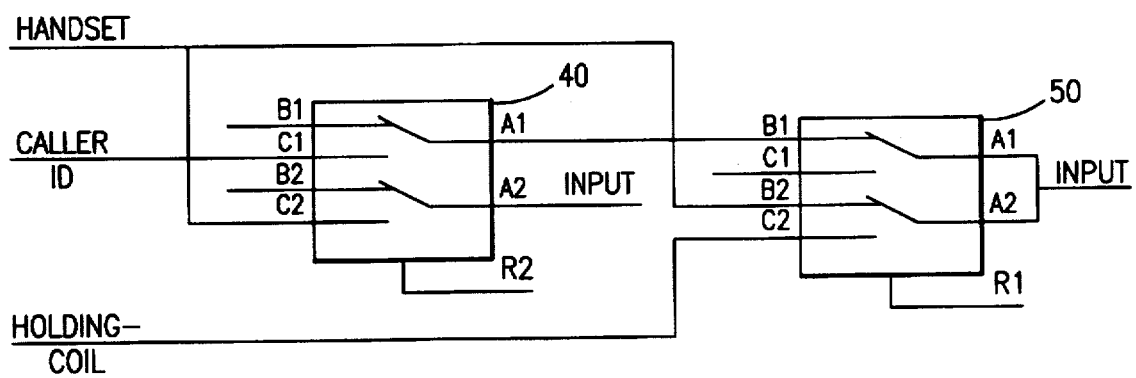
FIG. 2 is a circuit diagram showing a circuit diagram of the present invention.

The present invention ameliorates the problems and shortcomings of the prior art by using a two relay design as shown in FIG. 2. In FIG. 2, the two relays are relays 40 and 50. The two relay design of the present invention still maintains the four desired combinations which are required for voice/data/fax communication and only requires two 2-FORMC relays. Each of these 2-FORMC relays 40, 50 have two input terminals ($A_1$ and $A_2$) and two sets of output terminals ($B_1$, $B_2$ and $C_1$, $C_2$). When the two relays 40, 50 are not energized, the input terminals ($A_1$ and $A_2$) are connected directly to the output terminals ($B_1$ and $B_2$, respectively). When each of the relays is energized, both input terminals ($A_1$ and $A_2$) are connected to the opposite output terminal ($C_1$ and $C_2$, respectively). Each of these relays are energized by an independent control signal R1 or R2, with R1 providing the control signal to relay 50 and R2 providing the signal to relay 40.

The relay design of the present invention, an embodiment of which is depicted in FIG. 2, provides the same functionality of a conventional three relay design while lowering the component costs providing a smaller mechanical footprint and thereby improving the design reliability. Design reliability is also improved because fewer components are used. Furthermore, the amount of energy consumed may be significantly less depending upon the type of relays actually employed.

Figure 3:
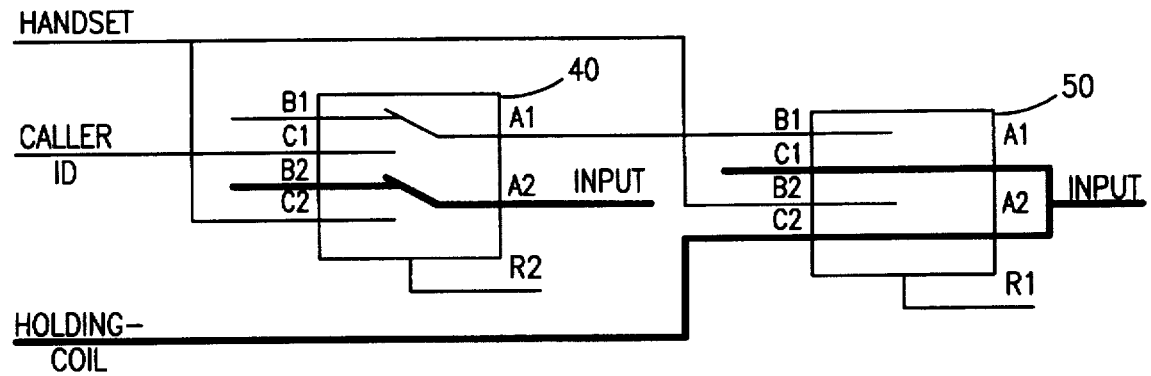
FIG. 3 depicts the circuit of FIG. 2 in a modem transmitter/receiver only state ("State 1")

How the circuitry of the present invention provides the same four states as the prior art system, but using less relays, should now be readily apparent to those skilled in the art. Specifically, referring to FIG. 3, how the modem transmitter/receiver only state (that is, State 1) can be provided is shown. In FIG. 3, the relay 50 is shown energized and the relay 40 is shown not energized. In that case, it can be seen that a connection (illustrated by the bold lines) is made between the input and the modem transmitter/receiver state only.

Figure 4:
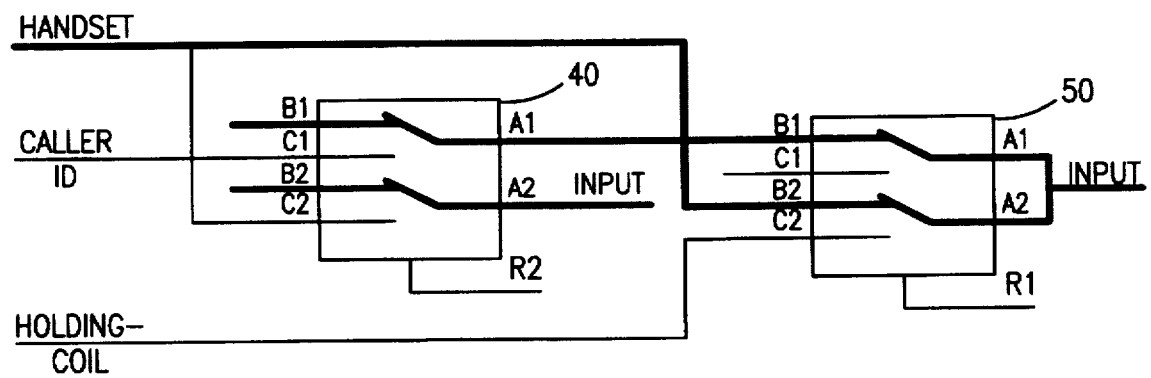
FIG. 4 depicts the circuit of FIG. 2 in a local telephone handset only state ("State 2")

Referring now to FIG. 4, there is shown an embodiment of the present invention in the local telephone handset only state (that is, State 2). This is the state also shown in FIG. 2, in which state both relays 40, 50 are non-energized. Following the bold lines in FIG. 4, it may be seen that in such a case a connection is made between the input and the local telephone handset state only.

Figure 5:
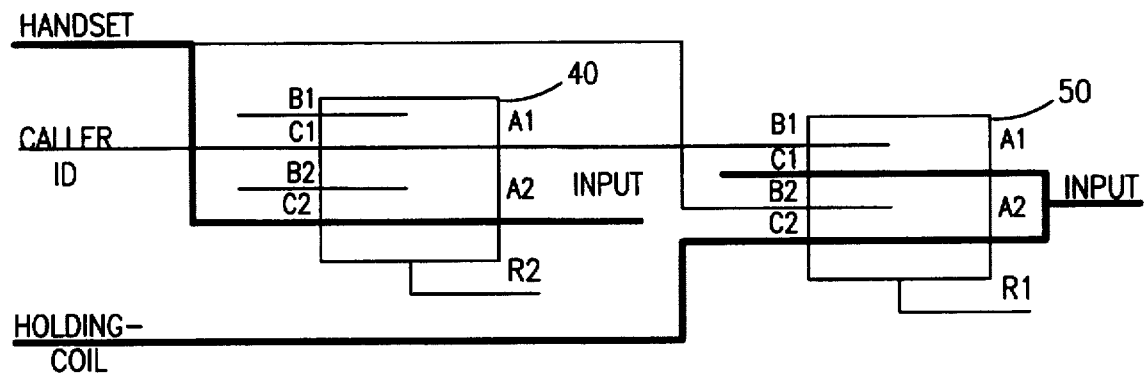
FIG. 5 depicts the circuit of FIG. 2 in a holding circuit of FIG. 2 in a modem transmitter/receiver and local telephone handset state ("State 3")

Referring now to FIG. 5, there is shown an embodiment of the present invention in the modem transmitter/receiver and local telephone handset state (State 3). In this state, both relays 40, 50 are energized.

Figure 6:
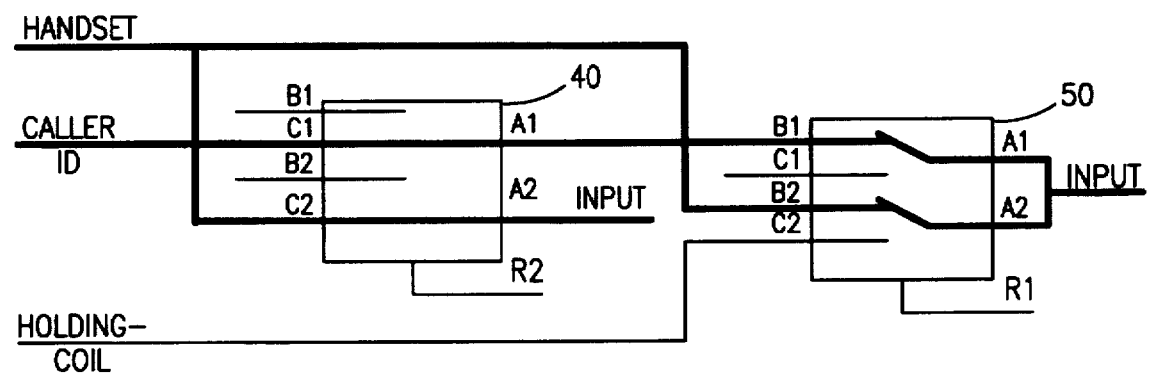
FIG. 6 depicts the circuit of FIG. 2 in a local telephone handset and caller-id receiver state ("State 4").

Finally, referring to FIG. 6, using the same conventions as in FIGS. 3-5, there is shown an embodiment of the present invention in the local telephone handset and caller-id receiver state (State 4). In this state, only relay 40 is energized.

It should now be understood and appreciated that embodiments of the present invention can achieve four states with two relays. Set forth immediately below is a Table 2 that illustrates how this is accomplished in the disclosed embodiment:

TABLE 2

| State | Relay 40 | Relay 50 |
|---|---|---|
| State 1 | non-energized | energized |
| State 2 | non-energized | non-energized |
| State 3 | energized | energized |
| State 4 | energized | non-energized |

Based on the foregoing, it should now be understood and appreciated that the present invention provides a relay circuit connection apparatus that is smaller and simpler than prior art apparatus, without any sacrifice of functionality.

Another noteworthy aspect of the present invention is proper performance during state transitions. It is often desirable to be able to transition between certain states without a disconnection. The present invention performs well in this regard. For example, the embodiment of the present invention disclosed herein can transition between the modem transmitter/receiver only state (State 1) and the modem transmitter/receiver and local telephone handset state (State 3) without disconnecting the common destination. Likewise, the embodiment of the present invention disclosed herein can transition between the local telephone handset only state (State 2) and the local telephone handset and caller-id receiver state (State 4) without disconnecting the handset.

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A modem relay circuit connection apparatus comprising:

at least one input connection port for connection to an analog telephone line;

a first relay having at least one input connected to said input connection port and having at least two output connection ports and wherein said output connection ports are connected to said input connection port in response to a first control signal; and a second relay having at least one input connected to at least one of said output connection ports of said first relay and having at least two output connection ports and wherein said output connection ports are connected to the input connection port of said second relay in response to a second control signal, said combination of said first relay and said second relay allows a caller identification to be enabled and disabled in accordance with said first control and said second control signal.

2. An apparatus as in claim 1 further comprising:

an output connection directly coupling an output connection port of said first relay and an output connection port of said second relay.

3. An apparatus as in claim 1 further comprising:

an output connection directly coupling an output connection port of said first relay without any connection of any output port of said second relay.

4. An apparatus as in claim 1 further comprising:

an output connection directly coupling an output connection port of said second relay without any connection of any output port of said first relay.

5. An apparatus as in claim 4 further comprising:

an output connection directly coupling an output connection port of said first relay and an output connection port of said second relay; and an output connection directly coupling an output connection port of said first relay without any connection of any output port of said second relay.

6. An apparatus comprising:

a relay system comprising a first relay and a second relay connected at least partially in series, which relays may be energized, and wherein said first relay and said second relay both receive a signal from a common input, wherein when both relays are energized, said input is connected through said relay system to a first point and a second point, and wherein when both relays are not energized, said input is connected through said relay system to said second point only; said combination of said first and said second relay allows a caller identification to be enabled and disenabled.

7. An apparatus as recited in claim 6, further wherein when said first relay is energized and said second relay is not energized, said input is connected through said relay system to said first point only.

8. An apparatus as recited in claim 7, further wherein when said first relay is not energized and said second relay is energized, said input is connected through said relay system to said second point and to a third point.

9. An apparatus as recited in claim 8, wherein said first point is associated with a first apparatus state, wherein said second point is associated with a second apparatus state, and wherein said third point is associated with a third apparatus state.

10. An electronic system having a modem relay circuit, said modem relay comprising:

a first relay having a first input connected to a phone line; and a second relay having a second input connected to an output of said first relay and a third input connected to said phone line, the combination of said first relay and said second relay allowing a caller identification function to be enabled and disabled.

11. The modem relay circuit of claim 10, further comprising a first control signal for controlling said first relay and a second control signal for controlling said second relay.

12. The relay circuit of claim 10, wherein four states are provided by said first relay and said second relay: a first state provides a modem transmitter/receiver state; a second state provides a handset state; a third state provides said modem transmitter/receiver state and second handset state; and a fourth state provides said handset state and a caller-id state.

* * * * *

UNITED STATES PATENT AND TRADEMARK OFFICE
CERTIFICATE OF CORRECTION

PATENT NO. : 5,748,719

DATED : May 5, 1998

INVENTOR(S) : Watts et al.

Page 1 of 2

It is certified that error appears in the above-identified patent and that said Letters Patent is hereby corrected as shown below:

| | |
|---|---|
| Column 4, line 52 | Remove "modem" |
| Column 4, line 66 through Column 5, line 2 | Replace "said combination of said first relay and said second relay allows a caller identification to be enabled and disabled in accordance with said first control and said second control signal." With --wherein said first control signal and said second control signal control said first relay and said second relay to enable and disable caller identification.-- |
| Column 6, line 15 | Remove "modem" |
| Column 6, line 16 | Remove "modem" |

UNITED STATES PATENT AND TRADEMARK OFFICE
CERTIFICATE OF CORRECTION

PATENT NO. : 5,748,719
DATED : May 5, 1998
INVENTOR(S) : Watts et al.

It is certified that error appears in the above-identified patent and that said Letters Patent is hereby corrected as shown below:

Column 6, line 22-24    Replace "the combination of said first relay and second relay allowing a caller identification function to be enabled and disabled."
With --wherein said first relay and said second relay enable and disable caller identification.--

Column 6, line 25    Remove "modem"

Signed and Sealed this

Sixth Day of October, 1998

Attest:

BRUCE LEHMAN

Attesting Officer    Commissioner of Patents and Trademarks